United States Patent
Oudelaar (10) Patent No.: US 7,252,029 B2
(45) Date of Patent: Aug. 7, 2007

(54) HYDRAULIC TILTING DEVICE FOR TILTING THE CAB OF A VEHICLE

(75) Inventor: Tone Oudelaar, Beuningen (NL)

(73) Assignee: Actuant Corporation, Glendale, WI (US)

( * ) Notice: Subject to any disclaimer, the term of this patent is extended or adjusted under 35 U.S.C. 154(b) by 103 days.

(21) Appl. No.: 10/538,340

(22) PCT Filed: Dec. 4, 2003

(86) PCT No.: PCT/NL03/00859

§ 371 (c)(1),
(2), (4) Date: Jun. 10, 2005

(87) PCT Pub. No.: WO2004/055388

PCT Pub. Date: Jul. 1, 2004

(65) Prior Publication Data

US 2006/0117943 A1    Jun. 8, 2006

(30) Foreign Application Priority Data

Dec. 13, 2002  (NL) .................................. 1022163

(51) Int. Cl.
 *F15B 21/02* (2006.01)
(52) U.S. Cl. .................... 91/40; 91/429; 137/624.14
(58) Field of Classification Search .............. 91/37, 91/40, 429; 137/624.14
See application file for complete search history.

(56) References Cited

U.S. PATENT DOCUMENTS 3,985,194 A    10/1976   Knutson
4,029,119 A     6/1977   Klieves
4,561,343 A *  12/1985   Mummert ................... 91/40
5,022,426 A     6/1991   Fischer
2002/0046834 A1  4/2002  Rayssiguier et al.

FOREIGN PATENT DOCUMENTS

EP    1 088 509 A1    4/2001
FR    2 743 047       4/1997

* cited by examiner

*Primary Examiner*—F. Daniel Lopez
(74) *Attorney, Agent, or Firm*—Quarles & Brady (57) ABSTRACT

A hydraulic tilting device for tilting the cab of a vehicle between a driving position, in which the vehicle can be driven normally, and a tilted position, in which, for example, maintenance can be carried out on a vehicle engine positioned beneath the cab. The tilting device comprises a double-acting tilting cylinder having a first and a second connection, a reservoir for hydraulic fluid and a pump having a single pumping direction, which pump has a suction port which is in communication with the reservoir and a single delivery port for delivering pressurized hydraulic fluid. The tilting device has a valve, in inlet passage of which is connected to there delivery port of the pump, which valve has an actuable shut-off member, so that in a first position thereof the delivery port is connected to the first connection of the tilting cylinder and in the second position thereof the delivery port is connected to the second connection of the tilting cylinder. The valve also has hydraulic actuating means for actuating the shut-off member, which hydraulic actuating means are designed in such a manner that, as a result of the pump supplying hydraulic fluid to the inlet passage, the shut-off member is moved into the first position or the second position, and as a result of this supply begin stopped or reduced and then being restored again, the shut-off member is moved into the second or first position, respectively.

32 Claims, 9 Drawing Sheets

HYDRAULIC TILTING DEVICE FOR TILTING THE CAB OF A VEHICLE

FIELD OF THE INVENTION

A first aspect of the present invention relates to a hydraulic tilting device for tilting the cab of a vehicle between a driving position, in which the vehicle can be driven normally, and a tilted position, in which, for example, maintenance can be carried out on a vehicle engine positioned beneath the cab.

BACKGROUND OF THE INVENTION

By way of example, U.S. Pat. No. 3,985,194 has disclosed a hydraulic cab-tilting device. This known device has a pair of double-acting tilting cylinders, each having a first and a second connection. Furthermore, there is a pump having one single pumping direction, which pump has a suction port which is in communication with a reservoir for hydraulic fluid and a single delivery port for delivering pressurized hydraulic fluid to the tilting cylinder(s). A manually actuated valve, the inlet passage of which is connected to the delivery port of the pump, is provided for retracting or extending the piston rods of the tilting cylinders as desired, which valve has a shut-off member, so that in a first position thereof the delivery port is connected to the first connection of the tilting cylinder and in the second position thereof the delivery port is connected to the second connection of the tilting cylinder.

Cab-tilting systems are also known in which the pump is of the type having two pumping directions, i.e. having two pump ports which act as a suction port or delivery port depending on the direction of rotation of the generally electric drive motor. The pump ports are each directly connected, via a line, to the connections of the cylinder. Rotating the drive motor in one direction then, for example, causes the piston rod of the cylinder to be retracted, and when the drive motor is rotating in the other direction the piston rod slides outwards. The direction of rotation of the pump in this case therefore functions as a control parameter.

One drawback of a pump with two pumping directions compared to a pump with a single pumping direction is that the pumping efficiency of a two-direction pump is often lower, and two-direction pumps are often also more expensive. This is offset by the fact that the additional control valve which is required in a pump having a single pumping direction represents additional costs and requires an additional feature for activating this control valve.

OBJECT OF THE INVENTION

It is an object of the first aspect of the present invention to provide an improved hydraulic cab-tilting device, in particular a cab-tilting device which makes use of a one-direction pump.

SUMMARY OF THE INVENTION

The first aspect of the invention provides a cab-tilting device, which is characterized in that the valve also comprises hydraulic actuating means for actuating the shut-off member, which hydraulic actuating means are designed in such a manner that, as a result of the pump supplying hydraulic fluid to the inlet passage, the shut-off member is moved into the first position or into the second position, and as a result of this supply then being stopped or reduced and then being restored again, the shut-off member is moved into the second position or first position, respectively.

The valve therefore ensures that one outlet passage and then the other outlet passage of the valve are alternately connected to the inlet passage, which outlet passages are each in communication with an associated connection of the tilting cylinder, the switching being effected by the supply of hydraulic fluid to the valve being stopped and then restored again. In combination with the pump having a single pumping direction, therefore, it is possible for the pump port to be connected to the other outlet passage as a result of the drive motor of the pump being stopped and started up again, so that then pressurized hydraulic fluid is delivered via the said other outlet passage. Interrupting and restarting the supply of hydraulic fluid to the valve in accordance with the invention therefore serves as a control signal and energy source for switching the shut-off member of the valve.

Preferably, the hydraulic actuating means comprise a (sliding) body which can be displaced between an at-rest position and an actuated position, is accommodated in the housing, and is displaced from the said at-rest position towards the actuated position as a result of hydraulic fluid being supplied to the inlet passage.

Preferably, the hydraulic actuating means comprise a body which can be displaced between an at-rest position and an actuated position and is accommodated in the housing, preferably a sliding body which can be slid inside an associated bore and moves from the said at-rest position to the actuated position as a result of hydraulic fluid being supplied to the inlet passage, as well as an associated restoring assembly for restoring the body.

Preferably, the displaceable (sliding) body is provided with a through-passage, in such a manner that flow of hydraulic fluid from the pump through the inlet passage and through the through-passage to an outlet passage of the valve moves the body towards the actuated position, counter to the action of the restoring assembly.

Preferably, a switching element is arranged between the said (sliding) body and the shut-off member, in such a manner that during a first displacement of the body towards the actuated position the shut-off member is moved to the first or second position, and as a result of this supply then being stopped or reduced and then restored again, the shut-off member is moved in the second or first position, respectively.

Further advantageous embodiments of the hydraulic cab-tilting device according to the invention are described in the subclaims and in the following description with reference to the drawing.

The first aspect of the invention also relates to a vehicle with a tiltable cab provided with a hydraulic cab-tilting device of this nature.

A second aspect of the invention relates to a hydraulic valve as described herein having a single inlet passage and two outlet passages, as is known per se, which valve alternately connects the inlet passage to one outlet passage or the other outlet passage. The valve according to the second aspect of the invention can be incorporated in a wide range of hydraulic systems, for example in a system as described above.

A third aspect of the present invention relates to a hydraulic pump assembly comprising a pump for pumping hydraulic fluid, which pump has a single suction port for sucking in hydraulic fluid and a single delivery port for delivering pressurized hydraulic fluid, a hydraulic valve having an entry passage which is connected to the delivery port and having two outlet passages being connected to the delivery port. In this case, the valve is designed in accordance with the first aspect of the invention, so that the pump device can deliver pressurized hydraulic fluid alternately via one of the two outlet passages of this valve.

DETAILED DESCRIPTION OF PREFERRED EMBODIMENTS

Figure 8:
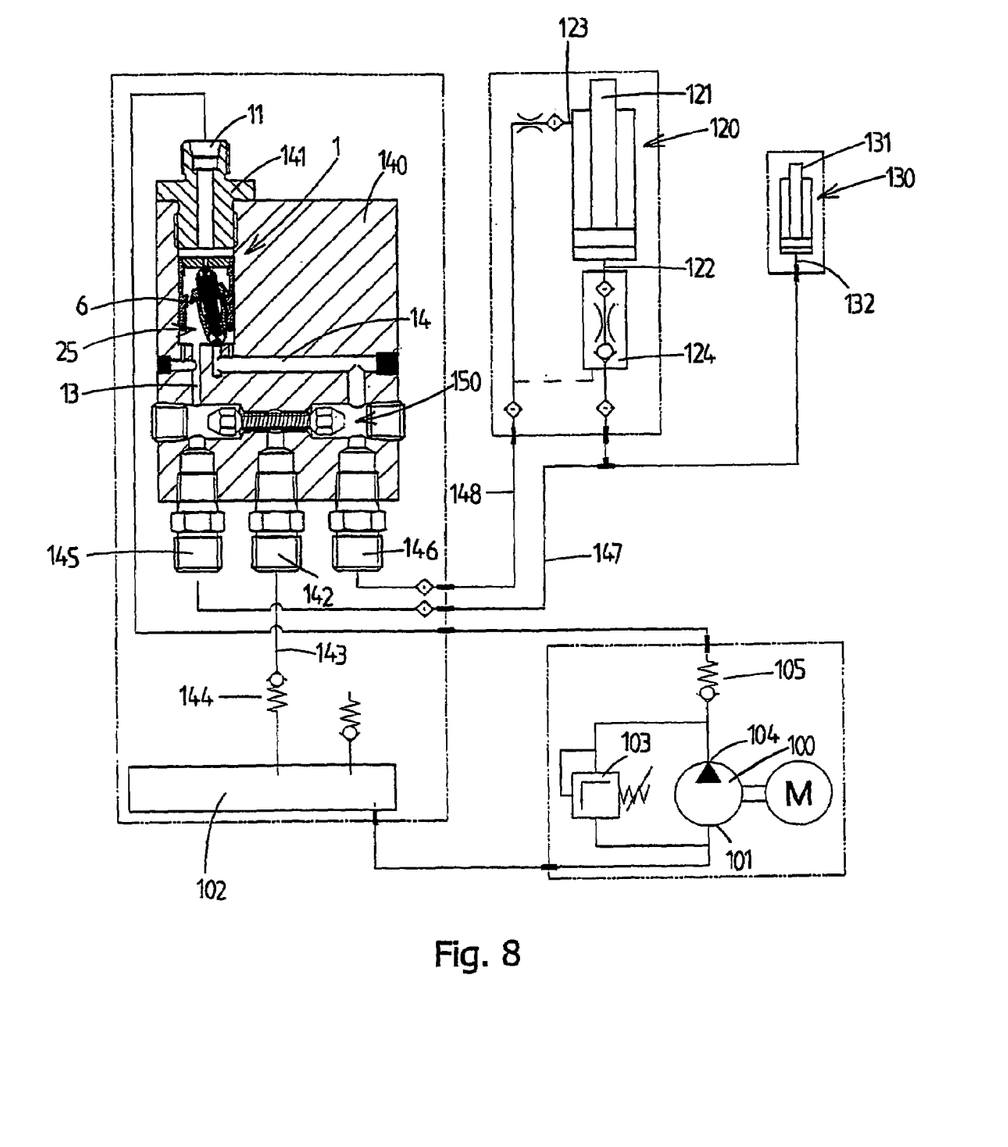
FIG. 8 shows a hydraulic circuit diagram of a hydraulic cab-tilting device according to the invention having the valve as shown in FIGS. 1a-d.

FIG. 8 shows an example of a hydraulic cab-tilting device having a valve according to the invention. The starting point in this figure in particular is the valve 1 which will be described in detail below with reference to FIGS. 1a-d. Where necessary, reference is made at this point to the corresponding explanation.

FIG. 8 shows the hydraulic circuit diagram of a hydraulic tilting device for tilting the cab of a vehicle between a driving position, in which the vehicle can be driven normally, and a tilted position, in which, for example, maintenance can be carried out on a vehicle engine positioned beneath the cab. A vehicle of this type usually comprises a chassis and a cab arranged tiltably on the chassis, with the tilting usually taking place forwards. To prevent undesired tilting, a locking mechanism is usually provided and this mechanism can act on the cab, generally in the vicinity of its rear side.

Reference numeral 100 denotes a hydraulic pump, which in this case is driven by an associated motor M. The pump is of the type having a pumping direction with a suction port 101, which is connected to a reservoir 102 for hydraulic fluid. The pump 100 also has one single delivery port 104 for delivering pressurized hydraulic fluid. A pressure-relief valve 103 connected to the delivery port 104 protects the system from an excessively high hydraulic pressure. Furthermore, there is a non-return valve 105 which closes in the direction of the delivery port 104. The dashed line contour surrounding the pump 100, motor M and valve 103 indicates that these components are integrated in one structural part.

Reference numeral 120 denotes a double-acting hydraulic tilting cylinder having a piston rod 121, a first connection 122 and a second connection 123. A hydraulically actuated non-return valve 124 is positioned upstream of the connection 122. The tilting cylinder 120, which is sometimes also designed as a pair of parallel-connected tilting cylinders, is usually arranged between the chassis and the cab.

Reference numeral 130 denotes a locking cylinder, which is designed to actuate a locking mechanism, by means of which the cab can be locked with respect to the chassis in its driving position. The locking cylinder 130 is of the single-acting type and has a piston rod 131 and a single hydraulic connection 132. As is generally known, many cabs are mounted in sprung fashion on the chassis in order to provide comfort for the occupants of the cab. Suitable means are provided for this purpose, and if appropriate the cab-tilting device is also modified, for example having a "lost-motion" feature.

A valve 1 of the type according to the invention is accommodated in a valve block 140. A screw-in nipple 141 forms the inlet passage 11 of the valve 1. Furthermore, there is a reservoir port 142, which is in communication with the reservoir 102 via a line 143. A non-return valve 144 which closes in the direction of the port 142 is accommodated in the line 143. The valve block 140 has a port 145 and a port 146. The port 145 is in communication with the connection 122 of the tilting cylinder 120 and with the connection 132 of the locking cylinder 130 via a line 147. The port 146 is in communication with the connection 123 of the tilting cylinder 120 via a line 148. The outlet passage 13 of the valve 1 is in direct communication with the port 145, and the outlet passage 14 is in direct communication with the port 146. It can also be seen that a shuttle valve 150 is accommodated in the valve block 140. The valve 150 is arranged between the outlet passages 13, 14 and in each case connects one of the outlet passages 13, 14 to the reservoir 102.

The hydraulic tilting device shown in FIG. 8 operates as follows. To tilt the cab, the pump 100 is put in operation. As a result, hydraulic fluid flows towards the valve 1. The sliding body 6 of the valve 1 then moves towards its actuated position and the assembly 25 adopts the diagonal position shown in FIG. 1b. In this position, the outlet passage 14 is shut off from the outlet chamber 10 and the fluid supplied via passage 11 flows via outlet passage 13 to the port 145 and via the line 147 to the connection 122 of the tilting cylinder 120. This causes the piston rod 121 to extend, so that the cab is tilted. Fluid can flow out of the other chamber of the cylinder 120 via the line 148 and the valve 150.

When the cab has reached its tilted forwards position, the pump 100 is stopped. This causes the flow through the through-passage 17 in the sliding body 6 to cease, so that the sliding body 6 is restored to the at-rest position by the assembly 25. As described with reference to FIG. 1, the assembly 25 is then tilted, resulting in the position shown in FIG. 1c.

If the cab needs to be tilted back towards the driving position, the pump 100 is put in operation again. The renewed supply of hydraulic fluid to inlet passage 11 leads to the sliding body 6 sliding towards the actuated position, as shown in FIG. 1d. In this position, the outlet passage 13 is closed off from the outlet chamber and this chamber 10 is in communication with the outlet passage 14. Via passage 14, the pressurized fluid reaches the connection 123 of the tilting cylinder 120. The connection 122 is in communication, via the non-return valve 124 which has now been opened, with the reservoir 102. In this way, the piston rod 121 can be retracted again.

It is clear from the above that the valve 1 brings about a switching operation on the basis of the pump 100 being stopped and restarted. Therefore, no additional control signal is required.

By suitably dimensioning the valve 1, it is possible to adjust the response of the valve 1, for example to achieve a slow reaction to the flow of fluid stopping, so that the valve 1 does not switch over immediately if the flow of fluid ceases briefly. If desired, it is also possible to create a valve 1 which reacts quickly.

It will be clear that the pump 100 can preferably deliver a substantially continuous flow of hydraulic fluid, since it is provided with a suitable drive, such as a motor, for example an electric or pneumatic motor. Many manually actuated pumps have a pump handle which can be pivoted up and down and supply a strongly pulsating flow of fluid which in each case ceases and is then built up again. A hand pump of this nature would cause the valve 1 to switch over after each movement of the pump, which is undesirable. A hand pump of this type delivering liquid discontinuously would therefore preferably not be used in the present instance or would only be used in combination with a feature which seeks to equalize the flow of fluid to the valve, for example an accumulator arranged between the pump and the valve 1.

Figure 9:
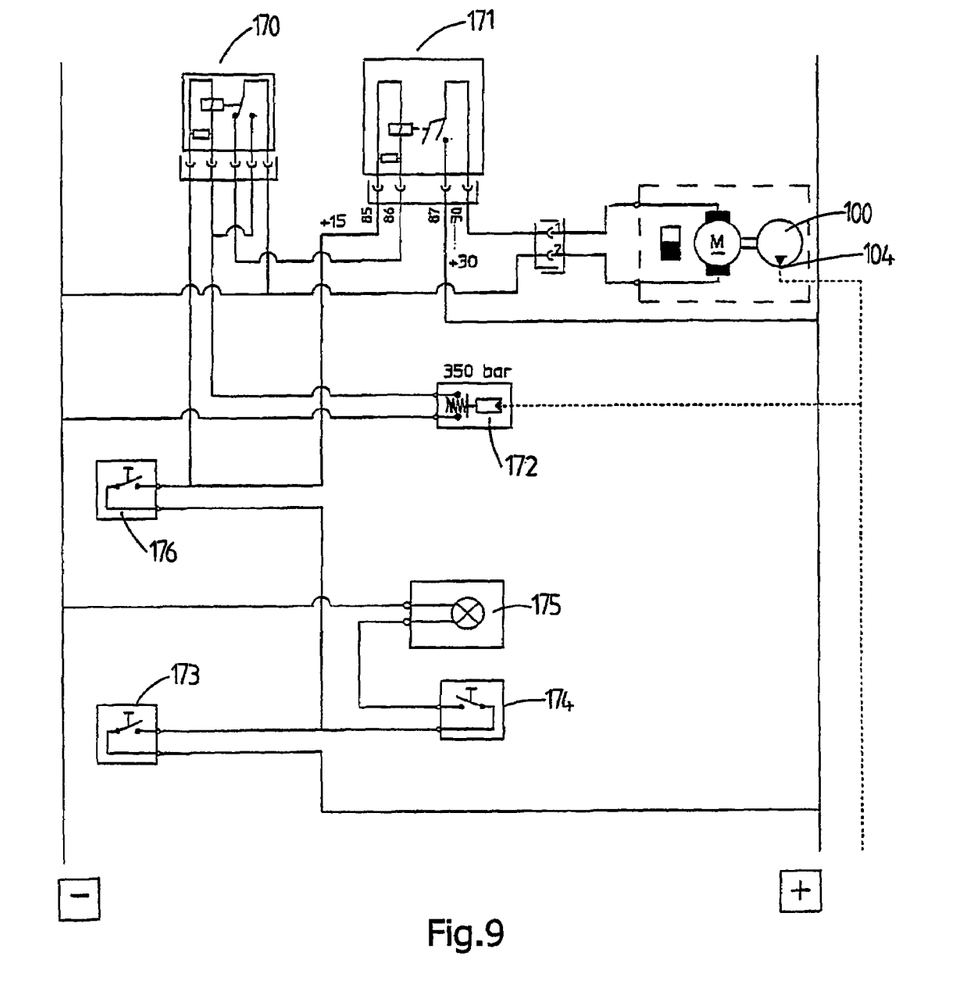
FIG. 9 shows an example of the electrical circuit diagram of the use presented in FIG. 5.

FIG. 9 shows a possible embodiment of the electrical system associated with the tilting device which has been explained with reference to FIG. 8. In FIG. 9, reference numeral 170 denotes a first relay and 171 denotes a second relay. There is also a pressure switch 172, which is in communication with the pressure port 104 of the pump 100. FIG. 9 also shows a main switch 173, a switch 174 which is actuated in the locked position of the cab, a control lamp switch 175 and a start/stop switch 176.

The pressure switch 172 is adjusted to a switching pressure which is higher than the normal working pressure of the hydraulic system while the cab is being tilted. However, the switching pressure is lower than the pressure which is reached if the piston rod 121 reaches one of its limit positions. The pump 100 should therefore be able to produce a pressure which is higher than the switching pressure, for example the switching pressure may be 350 bar. If the piston rod 121 reaches one of its limit positions, the pressure switch 175 is activated and the pump 100 is switched off. In fact, in this situation, it is possible to make do without the pressure-relief valve 103.

The electrical circuit diagram prevents the pump 100 from inadvertently being switched on again if the switch 176 remains actuated while the piston rod 121 was already in one of its limit positions and the pressure switch 172 had already switched off the pump 100.

FIGS. 1*a-d* diagrammatically depict longitudinal sections through the hydraulic valve 1.

The valve 1 comprises a housing 2 with a cylindrical bore 3 in the housing 2. The bore 3 has an imaginary axial axis 1 (cf. FIG. 1*a*) and at each of its axial ends is delimited by a base 4, 5 of the housing 2.

The valve 1 also comprises a sliding body 6 which can slide in a reciprocating manner in the axial direction in the bore 3. The sliding body 6 is in this case more or less cup-shaped, with an annular wall 7 and a transverse wall 8. The external diameter of the annular wall 7 is such that the sliding body 6 fits in a sealing manner to bore 3 with a sliding fit. If appropriate, one or more sealing rings or the like may be provided around the sliding body 6.

The sliding body 6 fits into the bore 7 in such a manner that an inlet chamber 9 and an outlet chamber 10 are defined in the bore 3. The sliding body 3 can slide between an at-rest position (FIGS. 1*a*, 1*c*) and an actuated position (FIGS. 1*b*, 1*d*).

In the housing 2 there is an inlet passage 11 which, at an inlet opening 12, is connected to the inlet chamber 9. Furthermore, a first outlet passage 13 and a second outlet passage 14 are formed in the housing 2. The outlet passages 13, 14 are each connected to the outlet chamber 10 at an associated first and second outlet opening 15, 16, respectively. The openings 15, 16 are located adjacent to one another in the base 5 of the housing 2.

A through-passage 17, which extends between the inlet chamber 9 and the outlet chamber 10, is provided centrally in the transverse wall 8 of the sliding body 6.

An actuable shut-off member 20, which in this case is in the form of a ball 20, is accommodated in the outlet chamber 10. The ball 20 can be displaced between a first position and a second position. In its first position (FIG. 1*c*), the ball 20 shuts off the first outlet opening 15, while the second outlet opening 16 is open. In its second position, the ball 20 shuts off the second outlet opening 16 and the first outlet opening 15 is open.

Furthermore, a switching assembly 25, which on one side acts on the sliding body 6 and on the other side acts on the ball 20, is accommodated in the outlet chamber 10. The assembly 25 comprises a telescopic switching element having a first body 26 and a second body 27, which bodies 26, 27 are guided telescopically with respect to one another. Furthermore, there is a spring 28 which forces the first and second bodies 26, 27 apart.

In this example, the first body 26 fits slideably into a receiving opening in the second body 27. The compression spring 28 is also located in this receiving opening. The ball 20 is arranged fixed to the second body 27. The telescopic switching assembly 25 can be elastically compressed under the influence of sliding of the sliding body 6 from the at-rest position towards the actuated position. The through-passage 17 in the sliding body 6 is such that a flow of hydraulic fluid from the inlet chamber 9 to the outlet chamber 10 causes the sliding body 6 to slide towards the actuated position. The assembly 25 restores the sliding body 6 towards the at-rest position when the hydraulic flow from the inlet chamber 9 towards the outlet chamber 10 ceases. The assembly 25 can adopt a first limit diagonal position (FIG. 1*c*) and a second limit diagonal position (FIG. 1*a*) with respect to the axial axis 1 of the valve 1.

When the sliding body 6 slides from the at-rest position towards the actuated position, the assembly 25, on account of hydraulic fluid flowing through the through-passage 17 in the sliding body 6, adopts the first limit diagonal position, and as a result holds the ball 20 in the first position. In this first position, the ball 20 bears in a sealing manner against the outlet opening 15 in the base 5. As a result, hydraulic fluid then flows from the inlet passage 9 towards the second outlet passage 14.

In the event of the sliding body 6 sliding towards the at-rest position under the influence of the said assembly 25, which sliding motion occurs when the said flow of hydraulic fluid through the through-passage 17 in the sliding body 6 ceases, the assembly 25 tilts. If the telescopic assembly 25 was in the first limit diagonal position, the tilting is directed in the direction of the second limit diagonal position.

During the subsequent sliding of the sliding body 6 towards the actuated position as a result of the hydraulic fluid flow through the through-passage 17 in the sliding body 6 being restored, the assembly 25 adopts the second limit diagonal position and thereby moves the ball 20 into its second position. In this second position, the ball 20 bears against the outlet opening 16 in the base 5, so that hydraulic fluid flows from the inlet passage 11 towards the first outlet passage 13. The assembly 25 can engage on the sliding body 6 at diametrically opposite positions, in each case so as to form a tilting point 30, 31 for the telescopic assembly 25, in such a manner that when the sliding body 6 is being restored to the at-rest position, the assembly 25, which is in the first or second limit diagonal position, executes a tilting motion with respect to the corresponding tilting point 30, 31, in the direction of the second or first limit diagonal position, respectively.

Figure 1A:
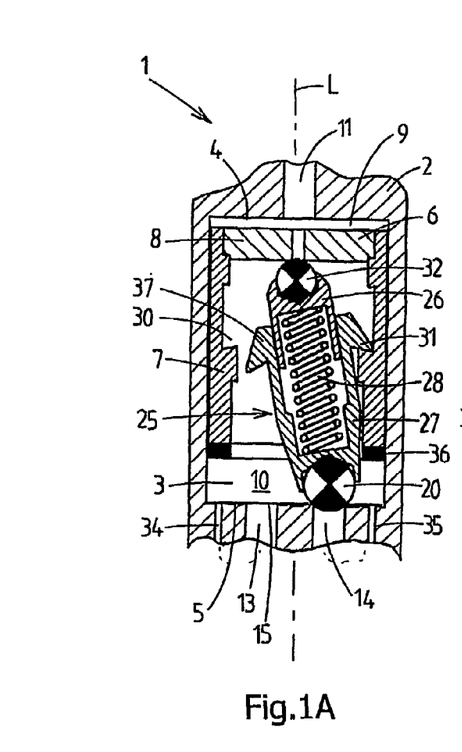
FIGS. 1a-d diagrammatically depict, in section and in successive positions, a first exemplary embodiment of the valve for the hydraulic cab-tilting device according to the invention, FIGS. 2a-d diagrammatically depict, in section and in successive positions, a second exemplary embodiment of the valve for the hydraulic cab-tilting device according to the invention, FIGS. 3a-d diagrammatically depict, in section and in successive positions, a third exemplary embodiment of the valve for the hydraulic cab-tilting device according to the invention, FIGS. 4a-d diagrammatically depict, in section and in successive positions, a first exemplary embodiment of the valve for the hydraulic cab-tilting device according to the invention, FIG. 5 diagrammatically depicts, in section, a fourth exemplary embodiment of the valve for the hydraulic cab-tilting device according to the invention.
Figure 1B:
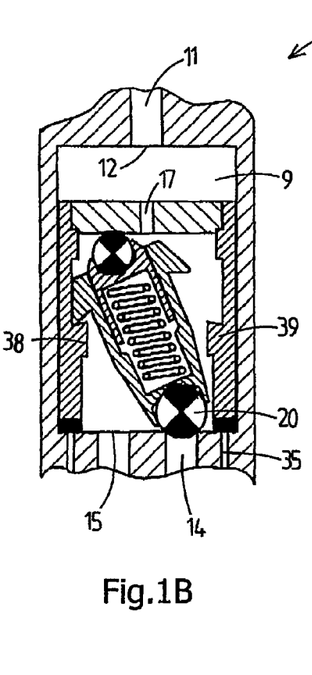
Figure 1C:
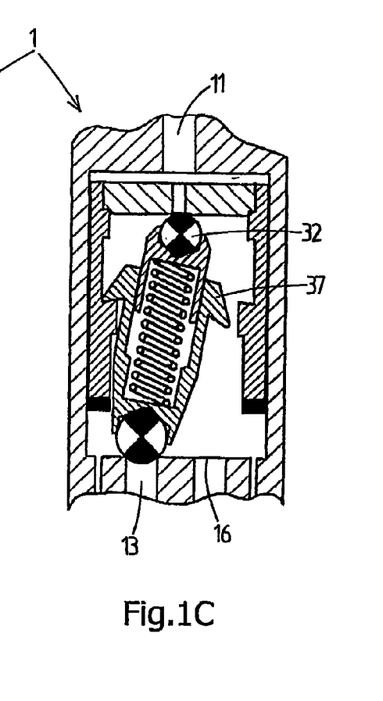
Figure 1D:
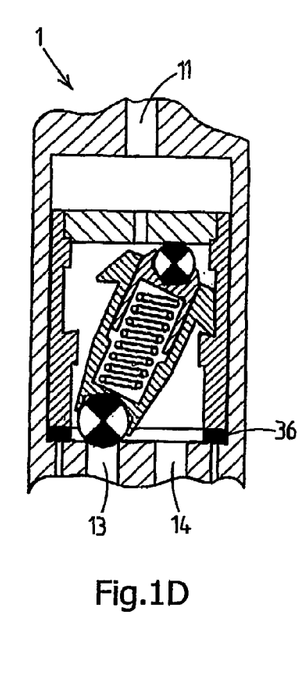
Figure 2A:
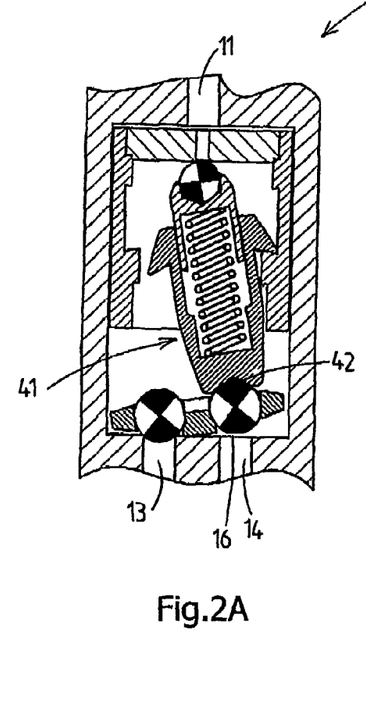
Figure 2B:
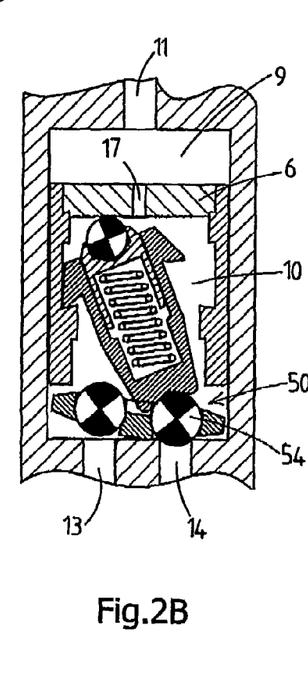
Figure 2C:
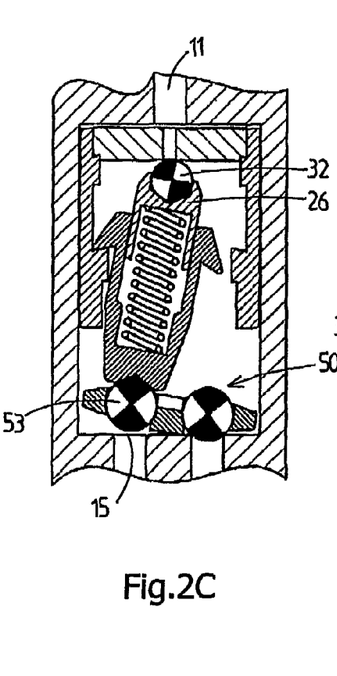
Figure 2D:
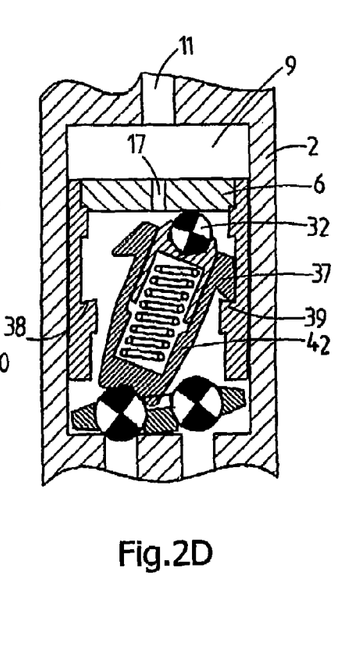

It can also be seen from FIGS. 1a, 1c that the switching element of the telescopic assembly 25 can engage, at diametrically opposite locations 30, 31, with the sliding body 6 so as to form a hook connection between the two components, in such a manner that in the event of the sliding body 6 being restored to the at-rest position, the assembly 25 which is in the first or second limit diagonal position tilts towards the other limit diagonal position and reaches an intermediate position (cf. FIGS. 1a, 1c).

It can also be seen from FIGS. 1a-d that a second ball 32 is provided for shutting off the through-passage 17 in the sliding body 6 in the at-rest position of the sliding body 6. The second ball 32 is fixed to the first body 26 of the assembly 25, in such a manner that in the first and second limit diagonal positions the second ball 32 opens up the through-passage 17 and in each intermediate position of the telescopic assembly 25 shuts off the through-passage 17.

Furthermore, a first and a second bypass passage 34, 35, the openings of which are connected to the outlet chamber 10 and respectively form a connection to the first and second outlet passages 13, 14 other than via the outlet openings 15, 16 thereof, are also provided in the housing 2. In the actuated position, the sliding body 6 shuts off the openings of the bypass passages 34, 35, and in a position other than the actuated position the openings of the bypass passages are opened up. For this purpose, a flexible sealing ring 36 is arranged on the bottom of the annular wall 7.

The function of the bypass passages 34, 35 is clearly apparent if the transition from the position shown in FIG. 1b to FIG. 1c is considered. As soon as the assembly 25 becomes longer, the sealing ring moves upwards and the bypass passages 34, 35 are connected to the outlet chamber 10. This is considerably earlier than the time at which the initially closed opening 15, 16 of the passage 13 or 14 is opened up. If the passages 13, 14 and the bypass passages 34, 35 are in communication with an unpressurized reservoir, the bypass passages 34, 35 therefore ensure that the pressure in the outlet chamber 10 drops quickly.

It can be seen from FIGS. 1a-d that the second body 27 is provided with an outwardly projecting circumferential edge 37 with an undercut. Furthermore, the sliding body 6, on the inside of the annular wall 7, is provided, at diametrically opposite positions, with tilting-point members 38, 39 having a corresponding undercut, in such a manner that the telescopic assembly 25, by engagement of the circumferential edge 37 with one of the tilting-point members 38, 39, forms a tilting point 30, 31 as well as a connection to the sliding body 6. The result of this is that in the event of the sliding body 6 sliding from the actuated position towards the at-rest position, the telescopic assembly 25 tilts about this corresponding tilting point towards an intermediate position and is held in this intermediate position. During a subsequent displacement of the sliding body 6 towards the actuated position, the circumferential edge 37 comes free of the corresponding tilting-point member, and the telescopic assembly 25 adopts its other limit diagonal position.

FIGS. 2a-d show another embodiment of the valve according to the invention; components which correspond to the valve 1 shown in FIGS. 1a-d are provided with the same reference numerals. In this case too, the valve 40 is provided with a sliding body 6, which can slide inside a bore in the housing 2 between an at-rest position and an actuated position.

Figure 6:
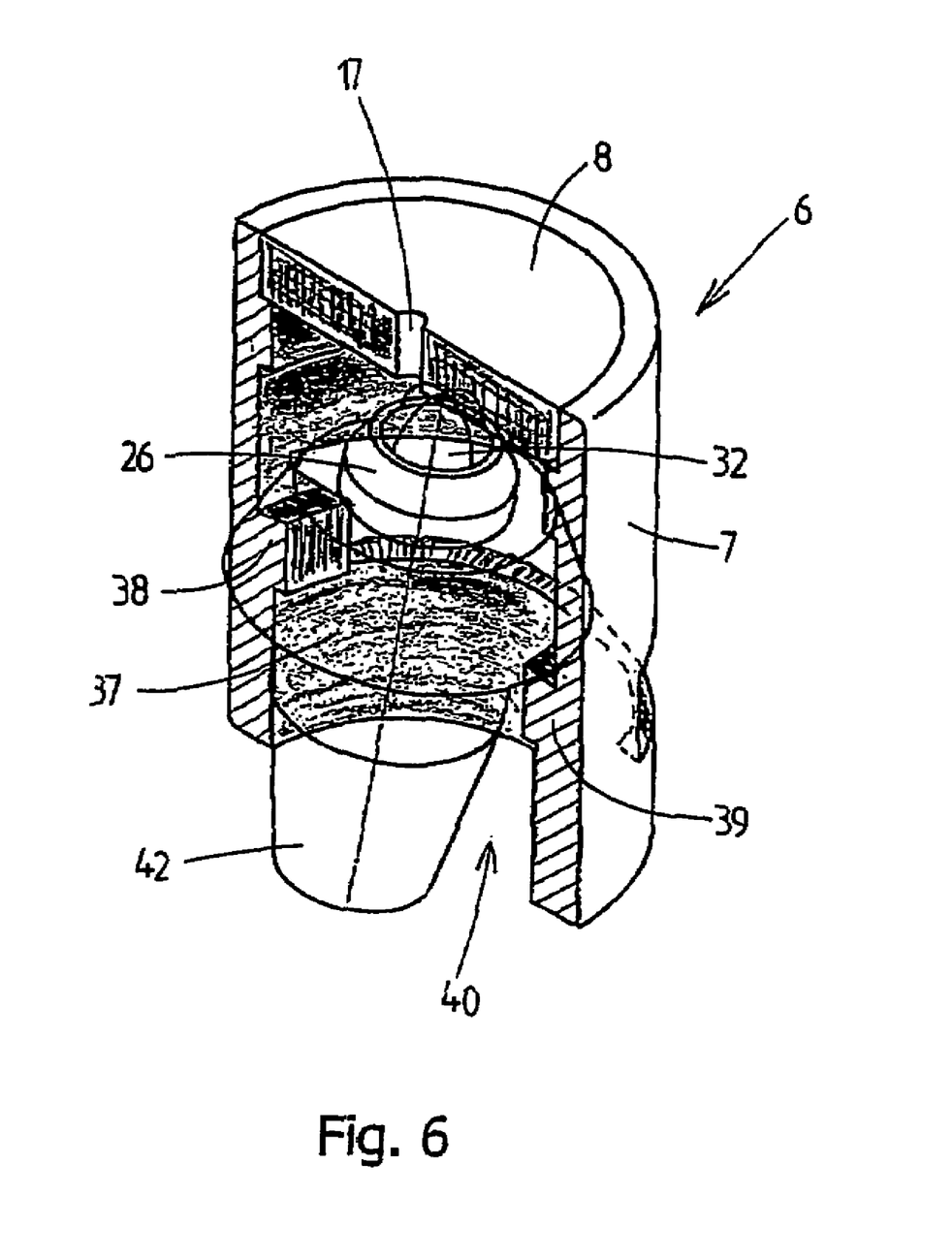
FIG. 6 shows a perspective, partially sectional view of part of the valve shown in FIGS. 2a-d, FIGS. 7a-c show a plan view, a cross section and a cross section with removed balls, of the shut-off member of the valve shown in FIGS. 2a-d.

The valve 40 has a telescopic assembly 41 which to a considerable degree corresponds to the assembly 25 of the valve 1. FIG. 6 clearly shows the sliding body 6 of the valve 40 as well as the telescopic assembly 41. In fact, the only difference from the assembly 25 is that the ball 20 is absent in the assembly 41, whereas in the assembly 25 this ball is integral with the body 27. Instead, the end of the body 42 forms a recess, by means of which the assembly 41 can engage on a ball, which does not belong to the telescopic assembly 41, of the first shut-off member 50, which is yet to be described. The shut-off member 50 will be explained in more detail, partly with reference to FIGS. 7a-c.

The shut-off member 50 is a separate component. The shut-off member 50 can be tilted with respect to the base 5 of the housing 2 about a tilting point 51 located between the openings of the outlet passages 13, 14 in the base 5.

Figure 7A:
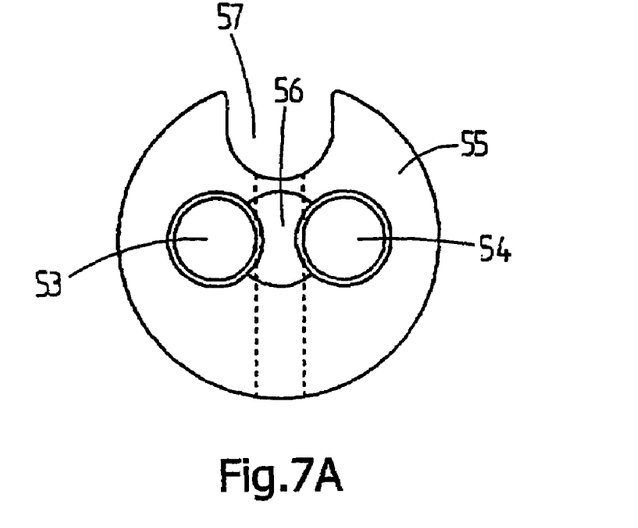
Figure 7B:
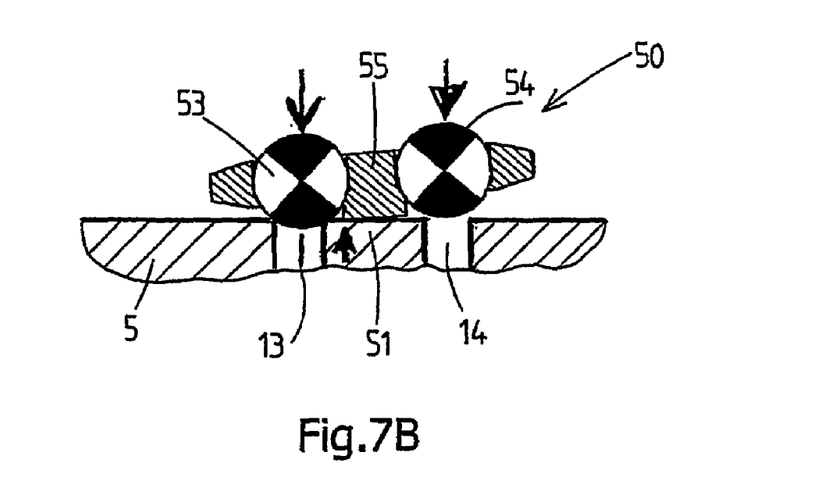
Figure 7C:
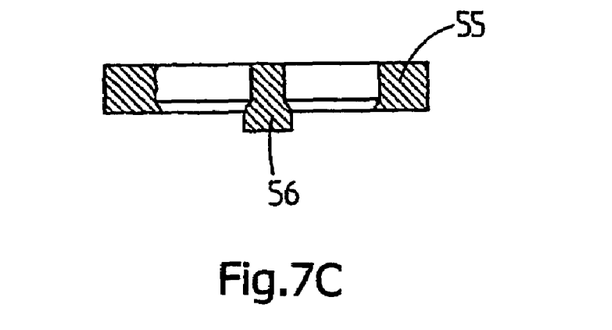

The shut-off member 50 comprises a first ball 53 and a second ball 54, which are accommodated in a common carrier 55, which carrier 55, between the balls 53, 54, is provided with a tilting projection 56, which at the tilting point 51 is tiltably supported on the base 5 of the housing 2. By way of example, the balls 53, 54 are made from metal and the carrier 55 is made from plastic. Furthermore, the carrier 55 is provided with a positioning recess 57, into which a part of the housing 2 (not shown) fits, so that the carrier 55 can tilt but cannot rotate with respect to the housing 2.

It can be seen from FIG. 7b that the balls 53, 54 on one side each form the shut-off surface for an outlet opening 15, 16 and on the other side also form the engagement formation for the telescopic assembly. These engagement formations are located on either side of the abovementioned tilting point 51 and are formed by those parts of the surface of the balls 53, 54 which face away from the base 5.

In the first limit diagonal position, the assembly 40 engages on the ball 53 and presses this ball 53 onto the outlet opening 15, so that the outlet passage 13 is shut off. In this first tilted position of the shut-off member 50, the ball 54 is located at a distance from the outlet opening 16 and the outlet passage 14 is open.

In the second limit diagonal position, the assembly 41 engages on the ball 54 and the outlet passage 14 is closed, while outlet passage 13 is held open. The telescopic assembly 41 is tilted in the same way as described with reference to FIGS. 1a-d and will therefore not be explained again. In the two intermediate positions of the telescopic assembly 41, the ball 32, which is integral with body 26, shuts off the through-passage 17 in the sliding body 6. The valve 60 in FIGS. 3a-d has a structure which deviates slightly from the valves 1 and 40 described above.

The housing 61 is provided with an inlet passage 11 and with outlet passages 62, 63 which are connected to a bore in the housing 61. A substantially cylindrical sleeve 64 is secured in the housing 61, for example with a clamp fit. The sleeve 64 extends over part of the axial length of the bore.

Sliding body 73 fits in an axially slidable manner into the sleeve 64 and is provided with through-passage 17 between the inlet chamber 9 and the outlet chamber 10. Between the sleeve 64 and the base 65 is a separate ring 66, which in this valve 60 serves as a first shut-off member for the outlet passages 62, 63. The ring 66 has a smaller external diameter than the bore in the housing 61 and can therefore move inside the bore with a certain play. Furthermore, the ring 66 is provided, on the side facing the base 5, with openings 67 through which fluid can pass, as will be explained below.

The sleeve 64 is provided, on its side facing the moveable ring 66, with diametrically opposite engagement formations 68, 69 for the telescopic assembly 70. The engagement formations 68, 69 lie on the same axial line as the openings of the outlet passages 63, 64. The engagement formations 68, 69 project inwardly with respect to the annular wall of the sleeve 64 and can form a stop for the sliding body 73 in the actuated position thereof.

The telescopic assembly 70 is substantially identical to the above-described assembly 25, but is now positioned upside-down. In this case, the first body 71 is now provided with a circumferential edge 72 which can be brought into engagement with one of the engagement formations 68, 69. It can be seen from FIG. 3a that the assembly 70 is in engagement with formation 69 and is therefore being held in an intermediate position.

Figure 3A:
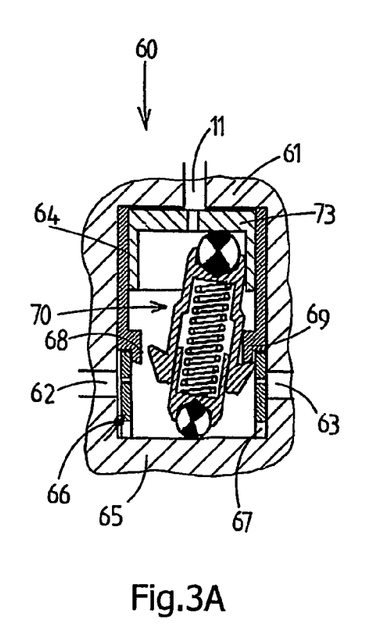
Figure 3B:
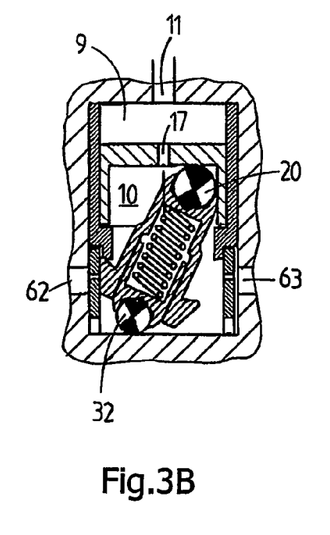

In FIG. 3b, the assembly 70 presses the ring 66 onto the circumferential wall of the bore at the location of the opening of outlet passage 62, which is as a result shut off.

Figure 3C:
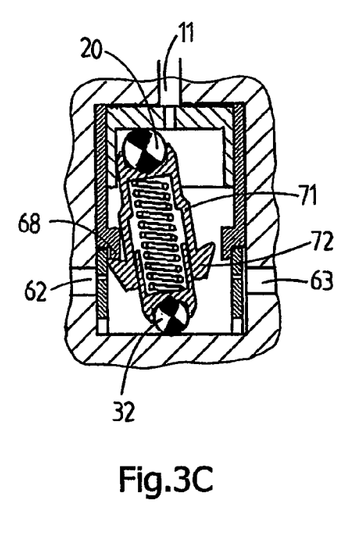

In FIG. 3c, the assembly 70 is in its other intermediate position, in which the assembly 70 is in engagement with the formation 68, which is stationary with respect to the housing 61.

Figure 3D:
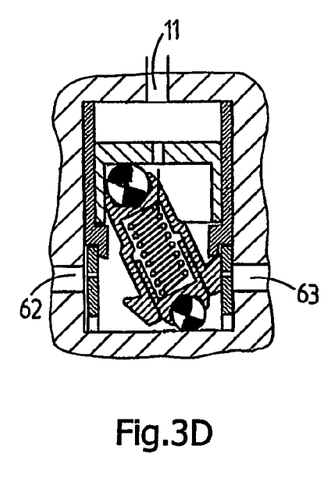
Figure 4A:
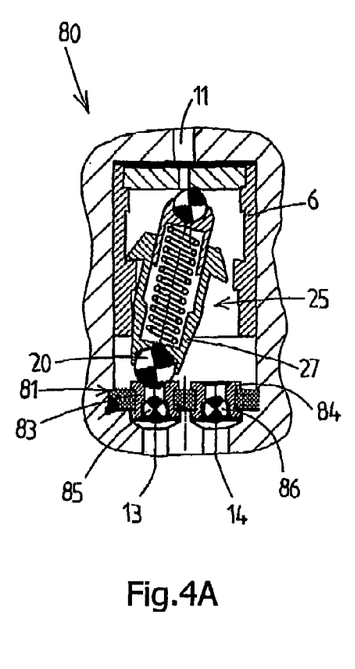
Figure 4B:
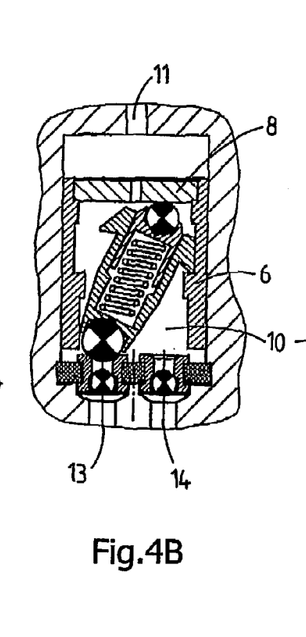
Figure 4C:
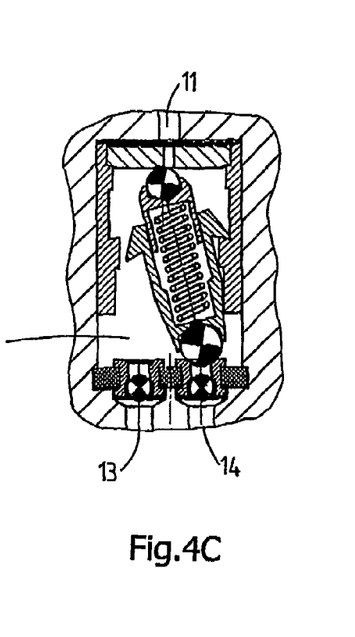
Figure 4D:
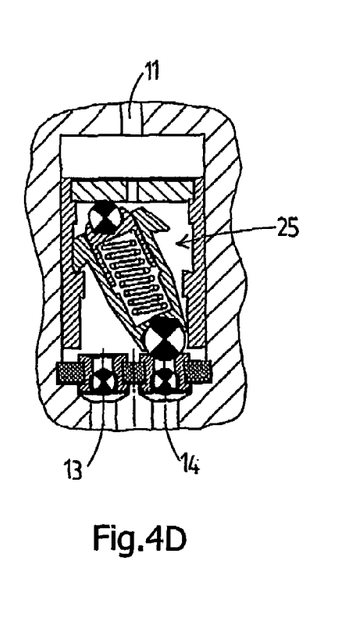

In FIG. 3d, the assembly 70 is in its other limit diagonal position, in which the assembly 70 presses the ring 66 onto the circumferential wall of the bore at the location of the opening of the outlet passage 63, so that this opening is shut off.

The ball 32 serves as a guide member and slides along the base of the housing 61. The ball 20, which in this case slides along the sliding member 73, has the same function. In the intermediate position of the assembly 70, there is no sealing of the through-passage 17 in the sliding body 73, as is the case in the valves which have been discussed above.

The valve 80 shown in FIGS. 4a-d corresponds to a considerable degree to the valve 1 shown in FIGS. 1a-d. For this reason, corresponding components are provided with the same reference numerals and reference is made to the earlier explanation for a description of the way in which they operate.

The ball 20 is in this case once again integral with the body 27 of the telescopic assembly 25.

A first difference is that the ball 32, in the intermediate positions of the telescopic assembly 25, does not seal the through-passage 17 in the sliding body 6, as is the case in the valve 1, but rather leaves it open. Therefore, the ball 32 does not perform a sealing function, but rather a guiding function for the assembly 25, guiding it along the transverse wall 8 of the sliding body 6.

A particular feature of the valve 80 is its design in the region of the connection of the outlet passages 13, 14 to the outlet chamber 10. A flexible disc 81, which bears against the base 5, is arranged on the base 5 of the housing 2. At its circumferential edge, the disc 81 is clamped into the housing 2. Openings are arranged in the disc 81 at the position of each of the outlet passages 13, 14. A sleeve 83, 84 in which there is a ball 85, 86 is arranged in these openings in such a manner that the balls 85, 86 act as non-return valves which close in the direction of the outlet chamber 10.

Those ends of the sleeves 83, 84 which are remote from the base 5 in each case form a seat for the ball 20.

In each of the limit diagonal positions of the telescopic assembly 25, the ball 20 presses on one of the sleeves 83, 84 and thereby presses this sleeve 83, 84 firmly onto the base 5 around the outlet passage 13, 14. As a result, the said outlet passage is shut off from the outlet chamber 10 and the chamber 10 is then in communication with the other outlet passage.

In the at-rest position of the sliding body 6, i.e. when no pressurized hydraulic fluid is being supplied to the inlet passage 11, it may be desirable for an excessively high pressure not to remain or form in one of the outlet passages 13, 14. The non-return valves 84, 85 close off these passages 13, 14. In the event of an excessive pressure in, for example, the outlet passage 13, the effect is achieved whereby the disc 81 adopts a convex position, so that in the region between the outlet openings, formed in the base 5, of the outlet passages 13, 14 and the underside of the disc 81 a connection is formed, along which this excess pressure can escape to the other outlet passage. In fact, therefore, the disc 81 forms an elastic pressure-relief valve between the outlet passages 13, 14, which valve is then actuated by the assembly 25 in such a manner that the pressure relief connection is closed when the sliding body 6 is in the actuated position.

Figure 5:
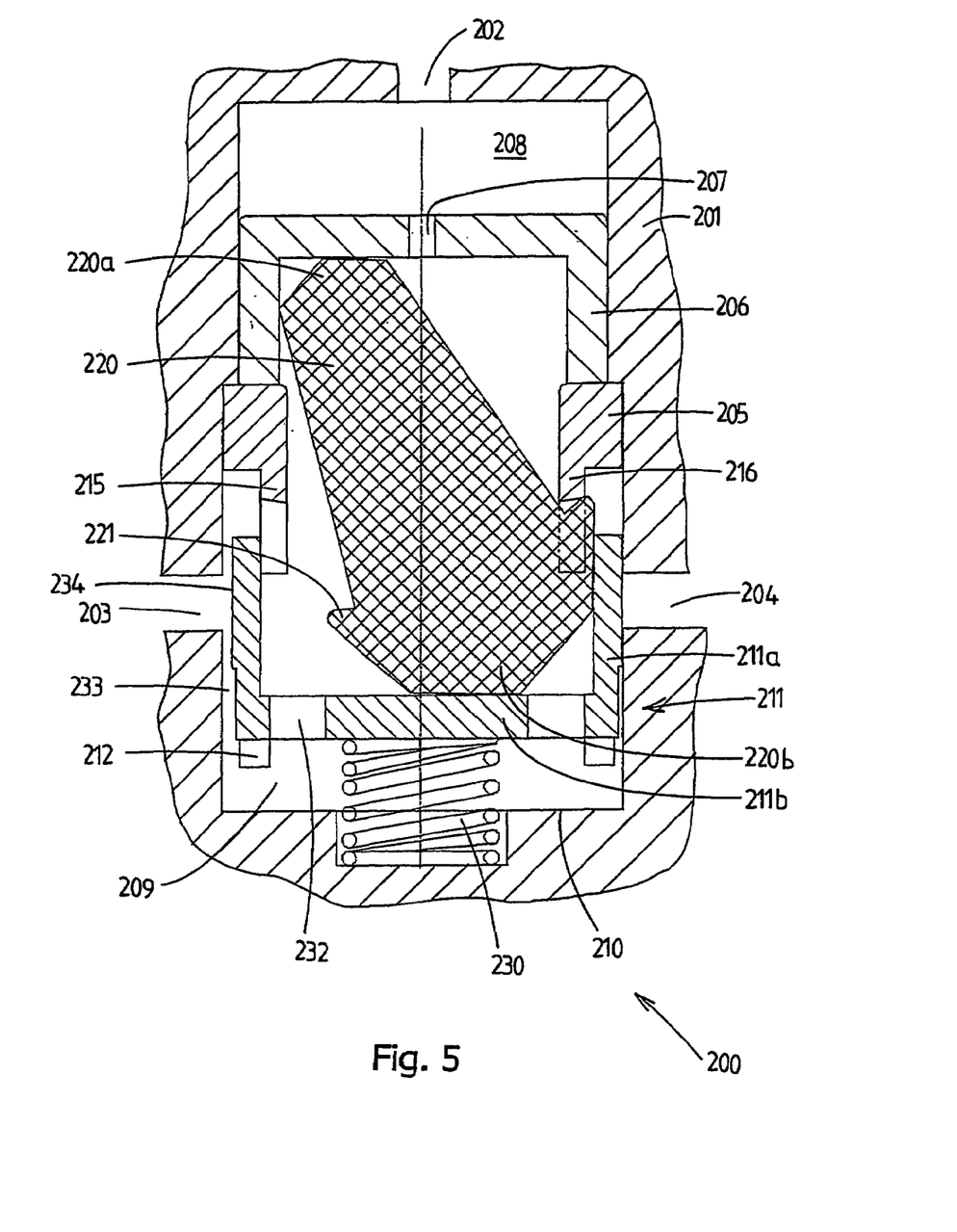

The valve 200 shown in FIG. 5 is a variant on the valve 60 shown in FIG. 3. Since the operation of the valve according to the invention has already been explained a number of times, in this case it will be sufficient just to describe FIG. 5.

The housing 201 is provided with an inlet passage 202 and with outlet passages 203, 204, which are connected to a bore in the housing 201. A substantially cylindrical sleeve 205 is secured in the housing 201, for example with a clamping fit. The sleeve 205 extends over part of the axial length of the bore. Sliding body 206 fits in an axially slideable manner into the bore and is provided with through-passage 207 between the inlet chamber 208 and the outlet chamber 209.

Between the sleeve 205 and the base 210 of the housing 201 there is a separate annular body 211 having an annular wall 211a and a base 211b, which in this valve 200 serves as a shut-off member for the outlet passages 203, 204. The annular body 211 has a smaller external diameter than the bore in the housing 201 and can therefore move inside the bore with a certain play. Furthermore, the annular body 211 is provided, on the side facing the base 210, with openings which are delimited by projections 212 and through which fluid can pass, as will be explained below.

On its side facing the moveable ring 211, the sleeve 205 is provided with diametrically opposite engagement formations 215, 216 for a rigid switching element 220. The engagement formations 215, 216 lie on the same axial line as the openings of the outlet passages 203, 204. The engagement formations 215, 216 project inwards with respect to the annular wall 211a, so that the top edge of the annular wall 211a is guided in such a manner that it can slide around them in the axial direction with radial play.

The rigid switching element 220 is provided with a circumferential edge 221, which can be brought into engagement with one of the engagement formations 215, 216. It can be seen from FIG. 5 that the switching element 220 is in engagement with formation 216. In this case, the sliding body 206 is in its actuated position, because there is a flow of fluid through the through-passage 207.

In FIG. 5, the switching element 220 presses the annular body 211 onto the circumferential wall of the bore at the location of the opening of the outlet passage 204, which is shut off as a result. The ends 220a, 220b of the switching element 220 are of pointed design and during operation slide along an associated wall of the sliding body 206 and the annular body 211. A spring 230 is positioned between the base 210 and the annular body 211 and presses the said annular body 211 in the direction of the switching element 220. The annular body 211 can therefore slide in the axial direction with respect to the housing 201.

In the outer circumference of the annular body 211, a bottom part 233 has a smaller diameter than a top part 234. As a result, liquid can flow towards an outlet passage 203, 204 as soon as the gap between the bottom part 233 and the wall of the bore in the housing 201 comes into communication with the said outlet passage. This provides the above-described effect of the bypass passages, which are therefore absent in this case.

Openings 232 for the flow of fluid through the valve 200 are also arranged in the base wall 211b.

To achieve a good sealing action, it is preferable for the annular body 211, in particular the annular wall 211a, to be flexible.

The invention claimed is:

1. A hydraulic tilting device for tilting a cab of a vehicle between a driving position, in which the vehicle can be driven normally, and a tilted position, comprising:
   a tilting cylinder having a first and a second connection,
   a reservoir for hydraulic fluid,
   a pump having one single pumping direction, which pump has a suction port, which is in communication with the reservoir, and a delivery port for delivering pressurized hydraulic fluid,
   a valve comprising a housing and an inlet passage which is connected to the delivery port of the pump and a first and a second outlet passage, which valve has an actuable shut-off member, so that in a first position thereof the delivery port is connected, via the first outlet passage, to the first connection of the tilting cylinder and in the second position thereof the delivery port is connected, via the second outlet passage, to the second connection of the tilting cylinder,
   wherein the valve also comprises hydraulic actuating means for actuating the shut-off member, the hydraulic actuating means comprising a body which is displaceable between an at-rest position and an actuated position and is accommodated in the housing, and an associated restoring assembly for restoring the body, the body including a through-passage, in such a manner that flow of hydraulic fluid from the pump through the inlet passage and through the through-passage to an outlet passage of the valve moves the body towards the actuated position, counter to the action of the restoring assembly, which hydraulic actuating means are further designed in such a manner that, as a result of the pump supplying hydraulic fluid to the inlet passage, the shut-off member is moved into the first position or into the second position, and as a result of this supply then being stopped or reduced and then being restored again, the shut-off member is moved into the second position or first position, respectively.

2. Hydraulic tilting device according to claim 1, wherein said body is a sliding body which is slideable inside an associated bore and moves from the said at-rest position to the actuated position as a result of hydraulic fluid being supplied to the inlet passage.

3. Hydraulic tilting device according to claim 1, in which a switching element is arranged between the said body and the shut-off member, in such a manner that during a first displacement of the body towards the actuated position the shut-off member is moved to the first or second position, and as a result of this supply then being stopped or reduced and then restored again, the shut-off member is moved in the second or first position, respectively.

4. A hydraulic tilting device for tilting a cab of a vehicle between a driving position, in which the vehicle can be driven normally, and a tilted position, comprising:
   a tilting cylinder having a first and a second connection,
   a reservoir for hydraulic fluid,
   a pump having one single pumping direction, which pump has a suction port, which is in communication with the reservoir, and a delivery port for delivering pressurized hydraulic fluid,
   a valve comprising:
   a housing,
   a bore in the housing, which bore has an imaginary axial axis and axial ends, wherein of the axial ends is delimited by a base of the housing,
   a sliding body which is slidable in a reciprocating manner in axial direction in the bore and defines an inlet chamber and an outlet chamber in the bore, which sliding body is slidable between an at-rest position and an actuated position,
   an inlet passage in the housing, which at an inlet opening is connected to the inlet chamber,
   a first outlet passage formed in the housing and a second outlet passage formed in the housing, which outlet passages are each connected to the outlet chamber at an associated first and second outlet opening, respectively,
   a through-passage, which extends between the inlet chamber and the outlet chamber, being provided in the sliding body,
   an actuable shut-off member, which in a first position thereof closes off the first outlet opening and opens up the second outlet opening and in a second position thereof opens up the first outlet opening and closes off the second outlet opening, being accommodated in the outlet chamber,
   a switching assembly for actuating the shut-off member also being accommodated in the outlet chamber,
   the switching assembly on one side acting on the sliding body and on the other side acting on the shut-off member,
   the through-passage in the sliding body being such that a flow of hydraulic fluid from the inlet chamber to the outlet chamber slides the sliding body towards the actuated position, and the sliding body returning to the at-rest position when this flow ceases,
   the switching assembly, in the event of the sliding body sliding from the at-rest position towards the actuated position as a result of hydraulic fluid flowing through the through-passage in the sliding body, holding the first shut-off member in the first position, so that hydraulic fluid flows from the inlet passage towards the second outlet passage,
   and the switching assembly, after this hydraulic flow has ceased and then been restored, so that the sliding body slides back towards the actuated position, moving the first shut-off member into the second position thereof, so that hydraulic fluid flows from the inlet passage to the first outlet passage, wherein the inlet passage is connected to the delivery port of the pump, so that when the shut-off member is in a first position the delivery port is connected, via the first outlet passage, to the first connection of the tilting cylinder and when the shut-off member is in the second position the delivery port is connected, via the second outlet passage, to the second connection of the tilting cylinder, and wherein the valve also comprises hydraulic actuating means for actuating the shut-off member, which hydraulic actuating means are designed in such a manner that, as a result of the pump supplying hydraulic fluid to the inlet passage, the shut-off member is moved into the first position or into the second position, and as a result of this supply then being stopped or reduced and then being restored again, the shut-off member is moved into the second position or first position, respectively.

5. Hydraulic tilting device according to claim 4, in which the switching assembly comprises a switching element, which is arranged in the outlet chamber between the sliding body and the shut-off member, and in which the switching assembly also comprises a spring element, which can be elastically compressed under the influence of the sliding body sliding from the at-rest position towards the actuated position, the switching assembly restoring the sliding body to the at-rest position when the hydraulic flow from the inlet chamber to the outlet chamber ceases, in which the switching element can adopt a first limit diagonal position and a second limit diagonal position with respect to the axial axis of the valve, in which the switching element, when the sliding body is sliding from the at-rest position towards the actuated position as a result of hydraulic fluid flowing through the through-passage in the sliding body, adopts the first limit diagonal position and thereby holds the shut-off member in the first position, so that hydraulic fluid flows from the inlet passage towards the second outlet passage, and in which the switching element, when the sliding body is sliding towards the at-rest position under influence of the said switching element, when the said hydraulic fluid flowing through the through-passage in the sliding body ceases, tilts in the direction of the second limit diagonal position, and in which the switching element, when the sliding body is subsequently sliding towards the actuated position as a result of the flow of hydraulic fluid through the through-passage into the sliding body being restored, adopts the second limit diagonal position and thereby moves the shut-off member into its second position, so that hydraulic fluid flows from the inlet passage towards the first outlet passage.

6. Hydraulic tilting device according to claim 5, in which the switching element is adapted to act, at diametrically opposite positions, on the housing or the sliding body, in each case so as to form a tilting point for the switching element, in such a manner that when the sliding body is being restored to the at-rest position, the switching element, which is located in the first or second limit diagonal position, executes a tilting motion with respect to the corresponding tilting point, in the direction of the second or first limit diagonal position, respectively.

7. Hydraulic tilting device according to claim 6, in which the switching element, at diametrically opposite positions, is adapted to come into engagement with the housing or the sliding body, so as to form a hook connection between the two components, in such a manner that when the sliding body is being restored to the at-rest position, the switching element, which is in the first or second limit diagonal position, tilts in the direction of the other limit diagonal position and reaches an intermediate position.

8. Hydraulic tilting device according to claim 5, in which the second shut-off member is actuable by the switching element, in such a manner that in the first and second limit diagonal positions the second shut-off member opens up the through-passage and in any intermediate position of the switching element shuts off the through-passage.

9. Hydraulic tilting device according to claim 8, wherein the second shut-off member is integral with the switching element.

10. Hydraulic tilting device according to claim 8, wherein the second shut-off member is a single ball.

11. Hydraulic tilting device according claim 5, in which the first shut-off member is integral with the switching element and the outlet openings of the first and second outlet passages are arranged in the base of the housing, in such a manner that in the first limit diagonal position of the switching element the first shut-off member bears in a sealing maimer against the outlet opening of the first outlet passage and in the second limit diagonal position bears against the outlet opening of the second outlet passage, and in which the first shut-off member is a single ball.

12. Hydraulic tilting device according to claim 4, in which the switching assembly comprises a telescopic switching element having a first body and a second body, which bodies are guided telescopically with respect to one another, and in which the spring element of the switching assembly is arranged in such a manner that the spring element forces the first and second bodies apart, with the first body acting on the sliding body and the second body acting on the shut-off member.

13. Hydraulic tilting device according to claim 4, in which the switching assembly comprises a rigid switching element having a first and a second end, which respectively act on the sliding body and on the shut-off member, and in which the spring element is arranged between the housing and the shut-off member.

14. Hydraulic tilting device according to claim 4, in which a second shut-off member is provided for shutting off the through-passage in the sliding body in the at-rest position of the sliding body.

15. Hydraulic tilting device according to claim 4, in which a first and a second bypass passages, an opening of which is connected to the outlet chamber, forming a connection between the first and second outlet passages other than via the outlet openings thereof, are provided in the housing, and in which the sliding body, in the actuated position, shuts off the openings of the bypass passages and, in a position which deviates from the actuated position, opens up the openings of the bypass passages.

16. Hydraulic tilting device according to claim 4, in which the first shut-off member is separate from the switching element, which first shut-off member can be tilted with respect to the base of the housing about a tilting point located between the openings of the outlet passages in the base, the first shut-off member being provided, on either side of the said tilting point, with a shut-off surface for the corresponding opening, in such a manner that in the first tilted position the first outlet opening is shut off and in the second tilted position the second outlet opening is shut off.

17. Hydraulic tilting device according to claim 16, in which the first shut-off member comprises a first and a second ball, which are accommodated in a common carrier, which carrier, between the balls, is tiltably supported on the base of the housing, and in which the first and second balls each on one side form the shut-off surface for an outlet opening and on the other side also form the engagement formation for the switching element.

18. Hydraulic tilting device according to claim 16, wherein the first shut-off member is provided with a first and a second engagement formation for the switching element, which engagement formations lie at a distance from one another on either side of the tilting point of the first shut-off member, in such a manner that in the first limit diagonal position the switching element engages on the first engagement formation and in the second limit diagonal position the switching element engages on the second engagement formation.

19. Hydraulic tilting device according to claim 4, in which the outlet openings are formed in the circumferential wall of the bore in the housing at diametrically opposite locations, and in which the first shut-off member is an annular body which fits into the bore with radial play, is situated at the location of the outlet openings in the bore and in a first position thereof covers the first outlet opening in a sealing manner and in the second position thereof covers the second outlet opening in a sealing manner, the switching element being designed to act on the annular body.

20. Hydraulic tilting device according to claim 19, in which the switching element is a telescopic switching element which is slidably supported against the base of the housing in the vicinity of the annular body.

21. Hydraulic tilting device according to claim 19, in which the switching element is a rigid switching element which is supported against the annular body, and in which the spring element is positioned between the housing and the annular body.

22. Hydraulic tilting device according to claim 19, in which one or more through-passages for hydraulic fluid to pass through are provided in the annular body.

23. Hydraulic tilting device according to claim 4, wherein wherein the openings of the outlet passages are formed in the base of the housing and wherein a flexible disc body bears against the base of the housing, and wherein said flexible disc body has openings therein at the position of each of the openings of the outlet passages, in which openings of the flexible disc body non-return valves are accommodated, which flexible disc body is fixed to the housing at its circumferential edge and in the region between the openings of the outlet passages in the base of the housing can bend elastically away from this base under the influence of an excess pressure in an outlet passage at least in the at-rest position of the sliding body of the valve.

24. Hydraulic tilting device according to claim 23, further comprising an actuable shut-off member integral with the switching element, and wherein the openings in the flexible disc body at the side opposed from the base each form a seat for said actuable shut-off element, in such a manner that in each limit diagonal position of the switching element an opening in said flexible disc body is closed by said actuable shut-off member.

25. Hydraulic tiling device according to claim 24, in which the outlet openings of the valve are each provided with a non-return valve which closes in the direction of the outlet chamber and wherein the non-return valves are accommodated in an elastically deformable body which, at least in a connecting region between the outlet passages, can bear in a sealing manner against the base of the housing.

26. A hydraulic tilting device for tilting a cab of a vehicle between a driving position, in which the vehicle can be driven normally, and a tilted position, comprising:
   a tilting cylinder having a first and a second connection,
   a reservoir for hydraulic fluid,
   a pump having one single pumping direction, which pump has a suction port, which is in communication with the reservoir, and a delivery port for delivering pressurized hydraulic fluid,
   a valve with an inlet passage which is connected to the delivery port of the pump and a first and a second outlet passage, which valve has an actuable shut-off member, so that in a first position thereof the delivery port is connected, via the first outlet passage, to the first connection of the tilting cylinder and in the second position thereof the delivery port is connected, via the second outlet passage, to the second connection of the tilting cylinder,
   wherein the valve also comprises hydraulic actuating means for actuating the shut-off member, which hydraulic actuating means are designed in such a manner that, as a result of the pump supplying hydraulic fluid to the inlet passage, the shut-off member is moved into the first position or into the second position, and as a result of this supply then being stopped or reduced and then being restored again, the shut-off member is moved into the second position or first position, respectively, in which the first and second outlet passages include an associated first and second outlet opening, respectively, and the outlet openings of the valve are each provided with a non-return valve which closes in the direction of the outlet chamber.

27. Hydraulic tilting device according to claim 26, in which the non-return valves are accommodated in an elastically deformable body which, at least in a connecting region between the outlet passages, can bear in a sealing manner against a base of the housing.

28. A hydraulic tilting device for tilting a cab of a vehicle between a driving position, in which the vehicle can be driven normally, and a tilted position, comprising:
   a tilting cylinder having a first and a second connection,
   a reservoir for hydraulic fluid,
   a pump having one single pumping direction, which pump has a suction port, which is in communication with the reservoir, and a delivery port for delivering pressurized hydraulic fluid,
   a valve comprising an inlet passage which is connected to the delivery port of the pump and a first and a second outlet passage, which valve has an actuable shut-off member, so that in a first position thereof the delivery port is connected, via the first outlet passage, to the first connection of the tilting cylinder and in the second position thereof the delivery port is connected, via the second outlet passage, to the second connection of the tilting cylinder,
   wherein the valve also comprises hydraulic actuating means for actuating the shut-off member, the hydraulic actuating means comprising a body which is displaceable between an at-rest position and an actuated position and is accommodated in the housing, and an associated restoring assembly for restoring the body, which hydraulic actuating means are designed in such a manner that, as a result of the pump supplying hydraulic fluid to the inlet passage, the shut-off member is moved into the first position or into the second position, and as a result of this supply then being stopped or reduced and then being restored again, the shut-off member is moved into the second position or first position, respectively, wherein said body is a sliding body which is slideable inside a bore and moves from the said at-rest position to the actuated position as a result of hydraulic fluid being supplied to the inlet passage and in which the sliding body is an annular body with a transverse wall provided with a central through-passage.

29. A hydraulic tilting device for tilting a cab of a vehicle between a driving position, in which the vehicle can be driven normally, and a tilted position, comprising:
a tilting cylinder having a first and a second connection,
a reservoir for hydraulic fluid,
a pump having one single pumping direction, which pump has a suction port, which is in communication with the reservoir, and a delivery port for delivering pressurized hydraulic fluid,
a valve comprising a housing and an inlet passage which is connected to the delivery port of the pump and a first and a second outlet passage, which valve has an actuable shut-off member, so that in a first position thereof the delivery port is connected, via the first outlet passage, to the first connection of the tilting cylinder and in the second position thereof the delivery port is connected, via the second outlet passage, to the second connection of the tilting cylinder,
wherein the valve also comprises hydraulic actuating means for actuating the shut-off member, the hydraulic actuating means comprising a body which is displaceable between an at-rest position and an actuated position and is accommodated in the housing, and an associated restoring assembly for restoring the body, which hydraulic actuating means are designed in such a manner that, as a result of the pump supplying hydraulic fluid to the inlet passage, the shut-off member is moved into the first position or into the second position, and as a result of this supply then being stopped or reduced and then being restored again, the shut-off member is moved into the second position or first position, respectively, and a switching element is arranged between the said body and the shut-off member, in such a manner that during a first displacement of the body towards the actuated position the shut-off member is moved to the first or second position, and as a result of this supply then being stopped or reduced and then restored again, the shut-off member is moved in the second or first position, respectively, and in which the switching element is provided with an outwardly projecting circumferential edge with an undercut, and in which the housing or sliding body is provided, at diametrically opposite positions, with tilting-point members with a corresponding undercut, in such a manner that the switching element, as a result of the circumferential edge engaging with a tilting-point member, forms a tilting point and a connection to the housing or the sliding body, so that when the sliding body is sliding from the actuated position towards the at-rest position the switching element tilts about the said corresponding tilting point towards an intermediate position and is held in this intermediate position, with the circumferential edge coming clear of the tilting-point member and the switching element adopting its other limit diagonal position when the sliding body subsequently slides towards the actuated position.

30. Hydraulic tilting device according to claim 29, in which the tilting-point member is provided on the sliding body and the circumferential edge is provided on the second body of the switching element.

31. Hydraulic tilting device according to claim 30, in which the tilting-point members are formed by creating an internal edge in the sliding body and then forming two slot recesses at the level of this edge, in such a manner that two diametrically opposite tilting-point members remain.

32. Hydraulic tilting device according to claim 29, in which the tilting-point member is provided on the housing and the circumferential edge is provided on the first body of the switching element.

* * * * *